(12) United States Patent  
Gurin

(10) Patent No.: US 9,247,688 B1  
(45) Date of Patent: Feb. 2, 2016

(54) NUTRIENT BLEND OPTIMIZATION SYSTEM

(71) Applicant: Michael H Gurin, Glenview, IL (US)

(72) Inventor: Michael H Gurin, Glenview, IL (US)

(*) Notice: Subject to any disclaimer, the term of this patent is extended or adjusted under 35 U.S.C. 154(b) by 106 days.

(21) Appl. No.: 13/922,241

(22) Filed: Jun. 19, 2013

(51) Int. Cl.  
*A01C 1/06* (2006.01)

(52) U.S. Cl.  
CPC .................................... *A01C 1/06* (2013.01)

(58) Field of Classification Search  
CPC ..... A01C 1/06; A01N 2300/00; A01N 25/00; A01N 61/00; Y10S 47/09; A01H 4/006  
See application file for complete search history.

(56) References Cited

U.S. PATENT DOCUMENTS

| | | | |
|---|---|---|---|
| 2004/0259732 A1* | 12/2004 | Asrar et al. | 504/103 |
| 2011/0053771 A1* | 3/2011 | Goodwin | 504/100 |
| 2011/0209404 A1* | 9/2011 | Scott | 47/58.1 LS |
| 2013/0203600 A1* | 8/2013 | Rees et al. | 504/208 |
| 2014/0087944 A1* | 3/2014 | Habib et al. | 504/100 |
| 2014/0109636 A1* | 4/2014 | Jessop | 71/7 |
| 2014/0121100 A1* | 5/2014 | Habib et al. | 504/100 |
| 2014/0137468 A1* | 5/2014 | Ching | 47/17 |
| 2014/0250778 A1* | 9/2014 | Suntych | 47/1.4 |

* cited by examiner

*Primary Examiner* — Kathleen Alker

(57) ABSTRACT

The growing management system optimizes peak aggregate nutrients for individual edible plants including vegetables, and herbs such that the individual edible plants are organized into a blend such that the aggregate of the individual edible plants are grown in a blend and that growing parameters including the use of seed coatings shift the occurrence of each of the individual edible plants peak nutrients to occur concurrently to maximize overall nutrient delivery. It is understood that nutrient and flavor peaks can be used interchangeably.

11 Claims, 4 Drawing Sheets

Coating - 20

NUTRIENT BLEND OPTIMIZATION SYSTEM

FIELD OF THE INVENTION

The present invention generally relates to blends of produce, grown in any method ranging from vertical, greenhouse, and hydroponic to aeroponic, and whether the produce is started from seeds, sprouts, or at staggered durations of prior growth such that each of the individual produce types reach their peak nutrient density concurrently for ease of harvesting, menu preparation, and ultimately dietary consumption of optimized nutrient rich foods.

BACKGROUND OF THE INVENTION

This invention addresses when the most beneficial time to harvest produce is based on nutrient optimization. Historically, growers were paid a certain price by weight whether per bushel or per pound. Therefore, measures of success were determined by how many bushels or pounds could be produced. This traditional metric was solely price-driven. In the past, the level of nutrients in the harvested produce was not taken into consideration.

Others have evaluated and made dietary recommendations on the consumption of nutrient dense fruits and vegetables based on the levels of micronutrients where the density is purely correlated with the fewest calories (e.g., Joel Fuhrman, M.D.). Today, with food being grown and shipped from far away and/or being harvested early and artificially ripened with chemicals the amount of nutrients consumers are actually receiving has been adversely impacted. Harvard Medical School's Center for Health and the Global Environment has shown that foods grown far away that spend significant time on the road have more time to lose nutrients before reaching the marketplace. In other words, consuming fruits and vegetables, all things equal, that are more devoid of nutrients defeats the purpose of consuming such fruits and vegetables in the first place.

Plants make a variety of compounds, many of which act as antioxidants when consumed. In reality, it is understood that plants in their natural form are superior to pure and highly processed antioxidants as compared to the full range of micronutrients present in live plants. Plants produce a unique pattern of reaching their maximum nutrient compound capacity, which is often concurrent with maximum flavor compound capacity. A landmark study by Donald Davis and his team of researchers from the University of Texas (UT) at Austin's Department of Chemistry and Biochemistry was published in December 2004 in the *Journal of the American College of Nutrition*. They studied U.S. Department of Agriculture nutritional data from both 1950 and 1999 for 43 different vegetables and fruits, finding "reliable declines" in the amount of protein, calcium, phosphorus, iron, riboflavin (vitamin B2) and vitamin C over the past half century. Davis and his colleagues chalk up this declining nutritional content to the preponderance of agricultural practices designed to improve traits (size, growth rate, pest resistance) other than nutrition. "Efforts to breed new varieties of crops that provide greater yield, pest resistance and climate adaptability have allowed crops to grow bigger and more rapidly," reported Davis, "but their ability to manufacture or uptake nutrients has not kept pace with their rapid growth." There have likely been declines in other nutrients, too, he said, such as magnesium, zinc and vitamins B-6 and E, but they were not studied in 1950 and more research is needed to find out how much less we are getting of these key vitamins and minerals. This further validates the requirement for the disclosed invention, a system to maximize nutrient and flavor and NOT to maximize revenue as traditionally directly correlated with weight of fruits and vegetables.

It is understood in the background that a wide range of sensors, ranging from spectrum analyzers (i.e., optical, and generally real-time and non-destructive) to chemical analyzers (i.e., GC mass spec, generally not real-time and destructive testing), exists in the art.

Furthermore, it is understood that plants grow (in nature as provided by the sun) the full light spectrum. Testing, originally attributed to space exploration, has lead to a more detailed understanding that red and blue are the two primary colors necessary to complete photosynthesis—the energy conversion where the plant transforms light into food and oxygen. The amount of red and blue light within a light source will affect plant growth in different ways. Blue light regulates the rate of a plants growth and is especially helpful in plants with lots of vegetation and few to no flowers. Blue light regulates many plant responses including stomata opening and phototropism. Stomata are openings on or beneath the surface of the leaves. A plant's moisture loss is primarily due to the stomata and blue light controls the degree of stomata opening, therefore blue light regulates the amount of water a plant retains or expels. Phototropism is the definition of a plant's response to light; the stems grow up toward the light and the roots grow down, away from the light. Metal halide grow lights emit more light in the blue spectrum and are the best source of indoor lighting to use for plant growth if there is no sunlight available. Red and orange light triggers hormones in plants that increase flowering and budding, but plants cannot grow with red light alone. They also need blue light to help regulate other types of responses. Red light stimulates flowering and foliage growth, but too much red light will cause a plant to become spindly. HPS (high-pressure sodium) grow lights emit a red orange glow and are excellent companion lights for growing conditions that include some natural sunlight or other light sources with high levels of blue light. Red light induces germination and blue light promotes seed growth, but far-red light inhibits germination.

Furthermore, it is understood that several phases of plant growth and resultant nutrient capacity are measured. Phase I is the early/immature stage of plant growth. During Phase I the plant has not reached the maximum peak potential of growth or nutrient optimization. Phase II is the mature stage of plant growth. During Phase II the plant has reached peak growth as well as peak nutrient optimization. Phase III is the post-mature stage of plant growth. During Phase III the plant is typically past the stage of optimal nutrient levels.

SUMMARY OF THE INVENTION

The present invention preferred embodiment relates to the creation of vegetable produce blends so that individual nutrient delivery is maximized for each vegetable produce and that the blend is created so that the peak of each vegetable produce nutrient delivery occurs at concurrent times for ease of preparation through consumption.

Another embodiment of the invention is the selective modification of the vegetable seeds through the use of seed coatings as known in the art to impact germination timing.

Yet another embodiment of the invention is the selective modification of the growing conditions including lighting intensity, lighting spectrum, pH, temperature such that each of the individual vegetable produce variety responds differently so as to relatively shift growth and ultimately harvest time with peak nutrient delivery.

DETAILED DESCRIPTION OF THE INVENTION

Figure 1:
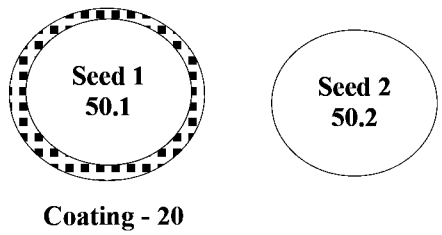
FIG. 1 is a diagram depicting the difference between a coated and un-coated (i.e., standard) seed.

The term "controlled farm", as used herein, includes any type of indoor farming such as a greenhouse, hoop house, vertical farm, aeroponic, hydroponic or aquaponic farm. These various types of indoor farms control the environment to varying degrees including lighting, temperature and irrigation.

The term "uncontrolled farm", as used herein, includes any type of outdoor farming. These types of farms do no control for environmental factors such as lighting, temperature and irrigation and are subject to natural variations in sunlight, temperature and rainfall.

The term "nutrient optimization", as used herein, includes methodologies to determine the more precise point in the growth of a plant such that the peak amounts of nutrients are delivered at the time of consumption. When the precise knowledge of consumption is not known, the peak amounts of nutrients are determined for harvest and/or packaging time. Nutrient optimization also refers to that precise point when the plant has reached the inflection point of nutrient normalized over the fully time amortized cost basis. It is understood that nutrients and flavors are used interchangeably in this invention, as nutrient and flavor compounds are closely linked at worst and at best are one of the same. Any use of nutrient optimization can be substituted for flavor optimization.

The term "sensors", as used herein, includes devices to measure important growing parameters for growing plants. These growing parameters include light level, temperature, carbon dioxide levels, oxygen levels, water levels, plant intake nutrients, and plant produced nutrients.

The term "O2:CO2", as used herein, is the ratio of oxygen to carbon dioxide present in the environmental air present. Air exchange in the context of consumer located spaces is currently based entirely on carbon dioxide ppm (parts per million), as absent of a co-located farm it is impractical to raise the amount of oxygen on a ppm basis without a complete fresh air exchange. Furthermore, it is equally impractical to raise the amount of oxygen for many combustion processes unless specific radiant qualities are desired due to the cost of oxygen generating equipment. However, a co-located oxygen-generating source enables superior cost effective recovery of waste heat from a co-located combustion process.

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. With regard to FIGS. 1 through 3, like reference numerals refer to like parts.

Turning to FIG. 1, FIG. 1 is a diagramming in which the first seed 50.1 has a coating 20 and the second seed 50.2 is void of a coating. The coating, as known in the art, decelerates the growth of the seed into a germinated seedling by reducing the water transmission (i.e., reducing moisture migration) into the seed. It is anticipated that other coatings, also as known in the art, can accelerate the growth of the seed into a germinated seedling by increasing the water transmission into the seed (i.e., high water retaining gels), or by having very localized fertilizer (or other active ingredients) to accelerate the growth. Though not typically used, localized presence of negative "actives" can slow down the growth into a seedling by other coatings. The creation of a blend of seeds of different species and/or varieties will typically have different harvest times. Thus FIG. 1 depicts on such method of delaying the harvest time relative to the second seed. This invention desires to maximize nutrient delivery, as opposed to maximum weight, in which each seed ideally reaches its peak nutrient content concurrently. At the very least, it is desired that the cumulative nutrient content of the aggregate summation of the seed blend is maximized. It is understood that a blend of seeds is selected to treat the same disease state, though where a first seed provides one active nutrient (e.g., lutein) for the same disease state (e.g., eye health) and the second seed provides another nutrient (e.g., beta-carotein) for that same disease state. It is further understood that the blend can consist of additional seeds with either similar active nutrients or ideally additional active nutrients in order to maximize health benefits. The seed coating both delays the sprouting (it is understood that germination and sprouting are used interchangeably, fundamentally referring to the state in which a dormant seed becomes an active/growing seedling) of the first seed relative to the second seed.

Figure 2:
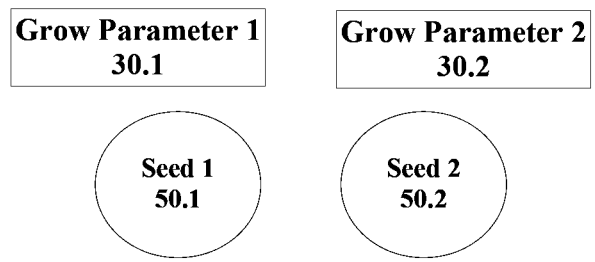
FIG. 2 is a diagram depicting a first seed growing under a first group of grow parameters, that differs from a second seed growing under a second group of grow parameters.

Turning to FIG. 2, FIG. 2 is a diagramming in which the first seed 50.1 has a first grouping of grow parameters 30.1 and the second seed 50.2 has a second grouping of grow parameters 30.2. It is known in the art that a range of grow parameters impact the rate of growth of the seed into a seedling and then finally into the harvestable state at which time the seed has transformed itself into a nutrient rich vegetable. These grow parameters include temperature, pH, nutrients in the soil, water, or growing media. It is further understood that each species and variety of seeds responds differently to these grow parameters thus providing the opportunity to practice the invention thus shifting the timing of reaching "maturity" with peak nutrient content. Additional grow parameters in which seed species and varieties have different sensitivity is the inclusion of actives selected from the group including a fertilizer selection process, a mineral selection process, a pesticide selection process, or a herbicide selection process.

Figure 3:
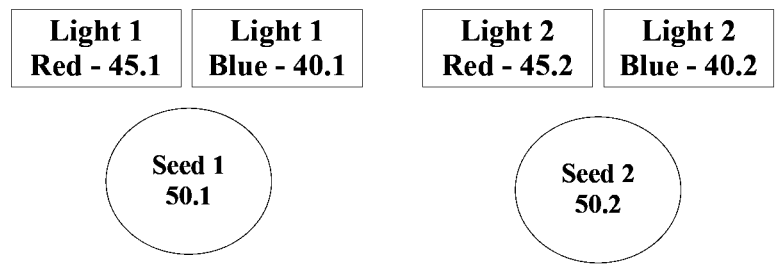
FIG. 3 is a diagram depicting a first seed growing under a first group of grow lighting conditions, that differs from a second seed growing under a second group of grow lighting conditions.

Turning to FIG. 3, FIG. 3 is a diagramming in which the first seed 50.1 has a first grouping of lighting spectrum parameters Light 1 Red 45.1 and Light 1 Blue 40.1 and the second seed 50.2 has a second grouping of lighting spectrum parameters Light 2 Red 45.2 and Light 2 Blue 40.2. It is known in the art that blue and red spectrum of lighting, which can be precisely regulated by the utilization of LEDS, are best controlled independently as the spectrum desired and the relative intensities between the blue and red spectrum varies as a function of time beginning from seed planting through seed/plant harvesting. A range of lighting spectrum impacts the rate of growth of the seed into a seedling and then finally into the harvestable state at which time the seed has transformed itself into a nutrient rich vegetable. These lighting spectrum parameters impact both the rate of nutrient accumulation and nutrient intensity. It is further understood that each species and variety of seeds responds differently to these lighting spectrum parameters thus providing the opportunity to practice the invention thus shifting the timing of reaching "maturity" with peak nutrient content. A light regulator, preferably precisely controlled by a nutrient blend management system, varies the lighting spectrum output and more preferably has the ability to vary relative intensities of the blue and red portion of the visible spectrum individually and independently of each other. Another portion of the spectrum in which independent control is desired and critical to nutrient density and accumulation is within the ultraviolet "UV" portion of the lighting spectrum. The increased seed sensitivity to the blue spectrum or red spectrum, of one first seed over a second seed has the ability to accelerate the harvest time relatively between the first seed and the second seed by a minimum of 30 minutes. It is understood that it is desirable to have both the first seed and the second seed reach peak nutrient content concurrently, and the fastest/most impactful method to shift peak nutrient content is through regulating blue and red spectrum, and most importantly taking advantage of the different responses of each first seed relative to each second seed to force this shift in timing. The ability to shift harvest time, through broad spectrums of lighting, and/or grow parameters is less responsive but nevertheless important with the shift being on the order of hours. The preferable performance is less than 24 hours, the more preferable performance is less than 6 hours, and the particularly preferable performance shift is less than 30 minutes. Lighting regulator, in terms of spectrum, intensity, and timing is best achieved in a vertical farm. Less control is achieved in terms of lighting, but ample control of grow parameters are also achieved in a greenhouse (which in the broadest definition is the inclusion of any physical structure to modify the environment, such as lighting spectrum or humidity levels, in which the seeds are grown).

The inventive process includes the specific selection of species and varieties such that each seed reaches peak nutrient content (or at least density) within the same time schedule. The more preferred selection of species and varieties have sufficiently different responses to lighting spectrum and/or grow parameters so that the inventive nutrient optimization system has the ability to utilize real-time monitoring throughout the growth stage to alter and correct for differences from scheduled nutrient levels as a function of time versus the historic/prior experience for each seed and or blend of seeds.

Figure 4:
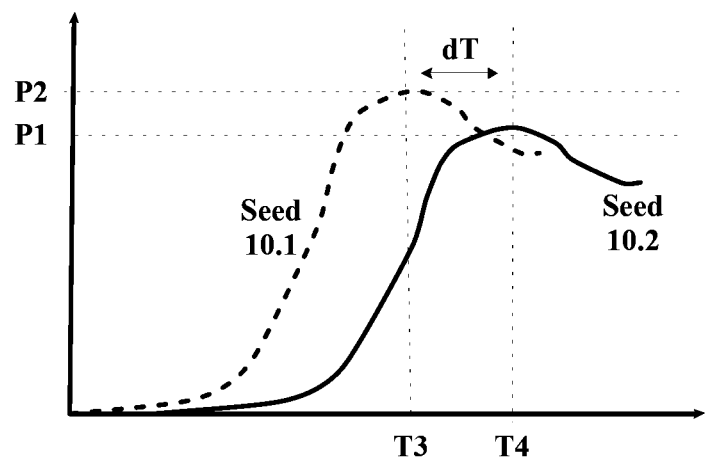
FIG. 4 is a peak nutrient curve for each of first seed and second seed, in which the natural state of growth takes place for each seed.

Turning to FIG. 4, FIG. 4 is a time domain 2-axis chart that depicts seed nutrient density levels. The Y-axis is a normalized level for each individual seed and/or aggregate of an individual nutrient within the seed blend. The X-axis is time, where the origin of X-axis is time (zero) where the seed blend is planted. The first seed 10.1 nutrient density curve is depicted by the dashed curve and the second seed 10.2 nutrient density curve is depicted by the solid curve. P1 depicts the lower of the peak nutrient densities between the first seed and the second seed, with P2 depicting the higher of the peak nutrient densities. FIG. 4 is the natural, non-modified rate of growth for each seed type within the blend. As depicted a delta-T "dT" (where T is time) occurs between the two separate peaks as indicated between T3 and T4.

Figure 5:
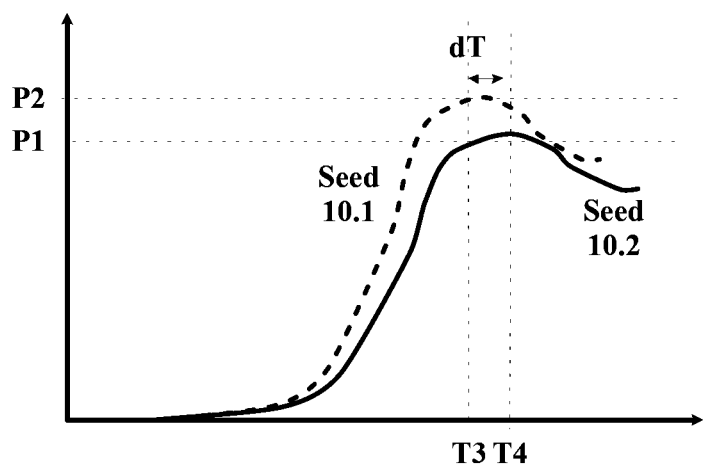
FIG. 5 is a peak nutrient curve for each of first seed and second seed, in which the natural state of growth is altered for the first seed to reduce the time difference of reaching peak nutrient relative to the second seed.

Turning to FIG. 5, FIG. 5 is also a time domain 2-axis chart that depicts seed nutrient density levels. The Y-axis is a normalized level for each individual seed and/or aggregate of an individual nutrient within the seed blend. The X-axis is time, where the origin of X-axis is time (zero) where the seed blend is planted. The first seed 10.1 nutrient density curve is depicted by the dashed curve and the second seed 10.2 nutrient density curve is depicted by the solid curve. P1 depicts the lower of the peak nutrient densities between the first seed and the second seed, with P2 depicting the higher of the peak nutrient densities. FIG. 5 is representative of results that are obtained when the first seed (10.1 nutrient density curve) is coated to deter moisture migration such that the otherwise natural dT between the seeds is reduced relative to second seed (10.2 nutrient density curve). The optimal reduction is such that T3 and T4 closely approximate each other. The preferable reduction for dT is less than 24 hours, the more preferable reduction is less than 6 hours, and the particularly preferred reduction is less than 30 minutes.

Figure 6:
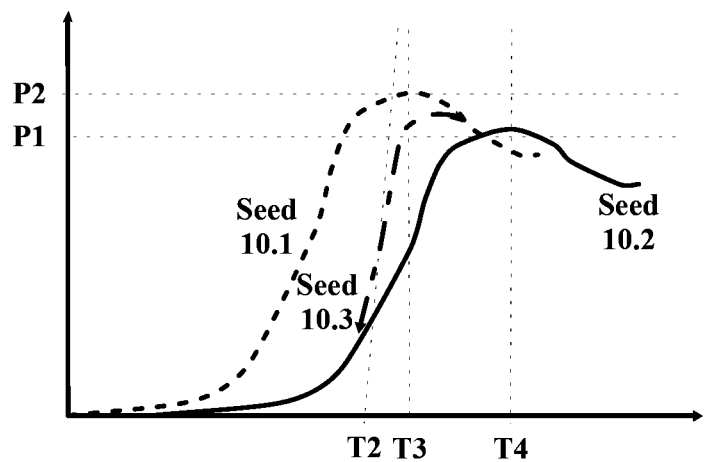
FIG. 6 is a peak nutrient curve for each of first seed and second seed, in which the natural state of growth is altered for the second seed to accelerate reaching peak nutrient content relative to its natural state of growth.

Turning to FIG. 6, FIG. 6 is also a time domain 2-axis chart that depicts seed nutrient density levels. The Y-axis is a normalized level for each individual seed and/or aggregate of an individual nutrient within the seed blend. The X-axis is time, where the origin of X-axis is time (zero) where the seed blend is planted. The first seed 10.1 nutrient density is depicted by the dashed curve with shorter dashes and the second seed 10.2 is depicted by the solid curve. The new addition of the dashed curve (with longer dashes), as indicated by seed 10.3, is relative to the natural non-modified growth cycle of second seed 10.2. P1 depicts the lower of the peak nutrient densities between the first seed and the second seed, with P2 depicting the higher of the peak nutrient densities. FIG. 6 is representative of results such that at time T2 (instead of T3) a grow parameter or lighting spectrum is regulated to accelerate the relative growth rate of second seed to shift from seed nutrient curve 10.2 to seed nutrient curve 10.3. The optimal reduction is such that T3 and T4 closely approximate each other. The preferable reduction for dT is less than 24 hours, the more preferable reduction is less than 6 hours, and the particularly preferred reduction is less than 30 minutes.

Figure 7:
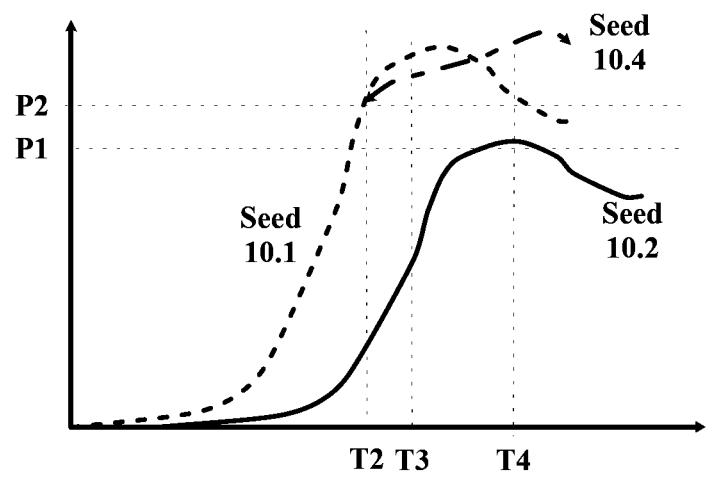
FIG. 7 is a peak nutrient curve for each of first seed and second seed, in which the natural state of growth is altered for the first seed to decelerate reaching peak nutrient content relative to its natural state of growth.

Turning to FIG. 7, FIG. 7 is also a time domain 2-axis chart that depicts seed nutrient density levels. The Y-axis is a normalized level for each individual seed and/or aggregate of an individual nutrient within the seed blend. The X-axis is time, where the origin of X-axis is time (zero) where the seed blend is planted. The first seed 10.1 nutrient density is depicted by the dashed curve with shorter dashes and the second seed 10.2 is depicted by the solid curve. The new addition of the dashed curve (with longer dashes), as indicated by seed 10.4, is relative to the natural non-modified growth cycle of first seed 10.1. P1 depicts the lower of the peak nutrient densities between the first seed and the second seed, with P2 depicting the higher of the peak nutrient densities. FIG. 7 is representative of results such that at time T2 (instead of T3) a grow parameter or lighting spectrum is regulated to decelerate (i.e., reduce) the relative growth rate of first seed to shift from seed nutrient curve 10.1 to seed nutrient curve 10.4. The optimal reduction is such that T3 and T4 closely approximate each other. The preferable reduction for dT is less than 24 hours, the more preferable reduction is less than 6 hours, and the particularly preferred reduction is less than 30 minutes.

Figure 8:
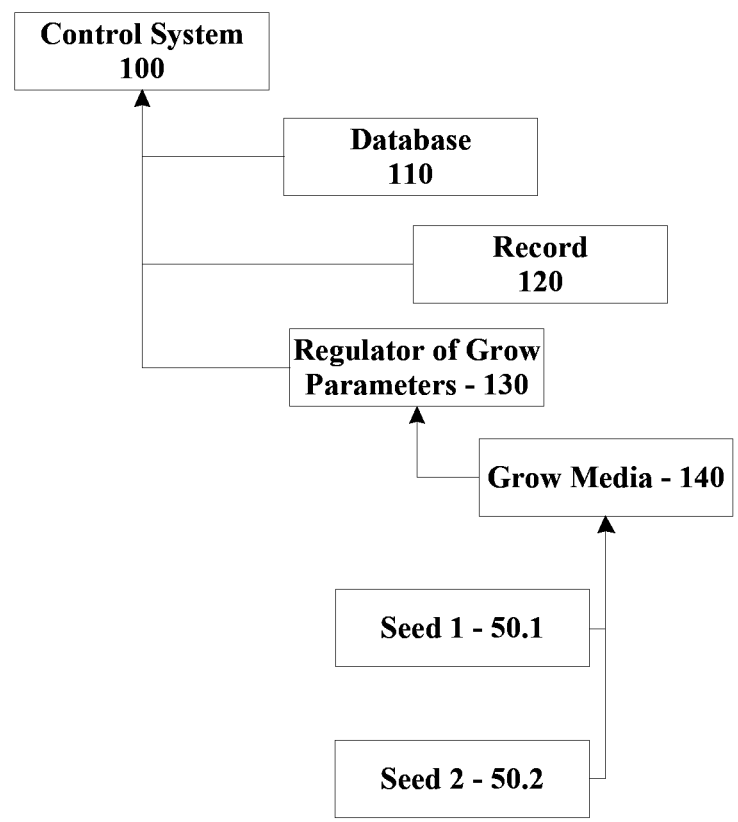
FIG. 8 is a nutrient blend control/management system depicting the architecture of the hardware/software system.

Turning to FIG. 8, FIG. 8 is a figure depicting the major components of the nutrient blend optimization control/management system The control system 100 has at least one database 110, which has at least one record 120 for each seed variety with individual parametric matrix including impact of lighting spectrum (e.g., blue and red intensity) and each of the aforementioned grow parameters. The record 120 contains a time domain analysis of nutrient density, which further includes optimal time of harvest for every parametric matrix. The time domain is preferably having a nutrient density level for each 30 minutes (or at least a multi-variate parameter representation centered around a scheduled harvest time/date relative to seed planting). The control system 100 utilizes the database and its full set of records to regulate (i.e., regulator 130) of the range of grow parameters (which includes lighting spectrum of blue/red intensities, though not shown). It is understood that a second set of records may be necessary for each grow media 140 in which the individual seeds of the blend are grown concurrently (such as first seed 50.1, and second seed 50.2) as indicated.

The plants grown in the invented nutrient blend optimization system is best utilized within a food formulation system to meet personalized recipes that modulate the ingredients used within the recipe in accordance to at least nutrient content and flavor content. It is understood that optimizing for concurrent nutrient peaks can be substituted for concurrent flavor peaks. The use of certain nutrient rich plants have significant flavor impact, in which case both nutrient and flavor normalization are appropriate in order to make/create great tasting food.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A nutrient blend control system comprised of a first seed and a second seed wherein the second seed has a second seed growth rate, and wherein the first seed has a first seed coating operable to delay a first seed germination time relative to a second seed germination time and further comprised of a light regulator operable to control a lighting spectrum output, a database and a database record for each of the first seed and the second seed with a parametric matrix for the lighting spectrum output in a time domain analysis of nutrient density from germination through harvest whereby both the first seed and the second seed reach peak nutrient density concurrently at a harvest time.

2. The nutrient blend control system according to claim 1 whereby the first seed coating decelerates seed germination time by reducing moisture migration into the first seed.

3. The nutrient blend control system according to claim 2 further comprised of at least one additional seed to deliver at least one nutrient operable to treat a same disease state.

4. The nutrient blend control system according to claim 1 wherein the light regulator controls an intensity of blue spectrum and an intensity of red spectrum operable to maximize nutrient density and to ensure nutrient content is maximized concurrently.

5. The nutrient blend control system according to claim 1 wherein the first seed has the first seed germination time, wherein the second seed has the second seed germination time, and whereby the first seed coating both delays the germination time of the first seed relative to the second seed, and reduces moisture migration into the first seed relative to the second seed.

6. The nutrient blend control system according to claim 1 whereby the first seed has an increased sensitivity to at least one light output of blue spectrum or red spectrum operable to promote a first seed growth by a minimum of 30 minutes relative to the second seed growth rate operable for the first seed and the second seed to reach peak nutrient content concurrently at the harvest time.

7. The nutrient blend control system according to claim 1 whereby the first seed has a decreased sensitivity to at least one light output of blue spectrum or red spectrum operable to delay a first seed growth by a minimum of 30 minutes relative to the second seed growth rate operable for the first seed and the second seed to reach peak nutrient content concurrently at the harvest time.

8. The nutrient blend control system according to claim 1 wherein the first seed is grown within a first intensity of blue light spectrum and a first intensity of red light spectrum and the second seed is grown within a second intensity of blue light spectrum and a second intensity of red light spectrum, and whereby the first intensity of red light spectrum is not equivalent to the second intensity of red light spectrum.

9. The nutrient blend control system according to claim 1 wherein the first seed is grown within a first intensity of blue light spectrum and a first intensity of red light spectrum and the second seed is grown within a second intensity of blue light spectrum and a second intensity of red light spectrum, and whereby the first intensity of blue light spectrum is not equivalent to the second intensity of blue light spectrum.

10. The nutrient blend control system according to claim 1, wherein a first seed growth rate is accelerated or decelerated relative to the second seed growth rate by changing at least one growing parameter including pH and temperature.

11. The nutrient blend control system according to claim 1 whereby the first seed has a peak nutrient density and the second seed has a peak nutrient density and whereby a cumulative nutrient density is comprised of the first seed nutrient density and the second seed nutrient density whereby the cumulative peak nutrient density occurs within less than 1 day of the first seed peak nutrient density and the second seed peak nutrient density.

* * * * *